Dec. 10, 1946.    L. F. CARTER ET AL    2,412,204
TORQUE EXERTING MEANS
Filed April 10, 1942    2 Sheets-Sheet 1
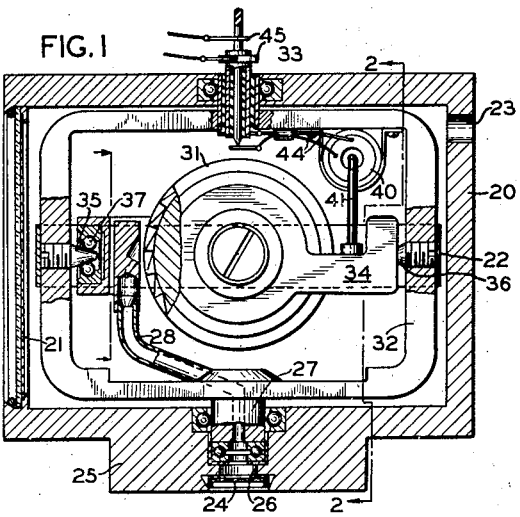
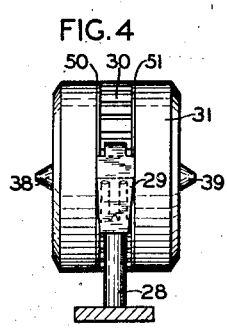
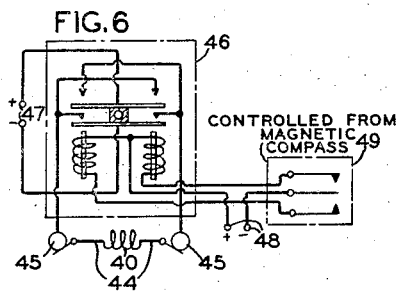
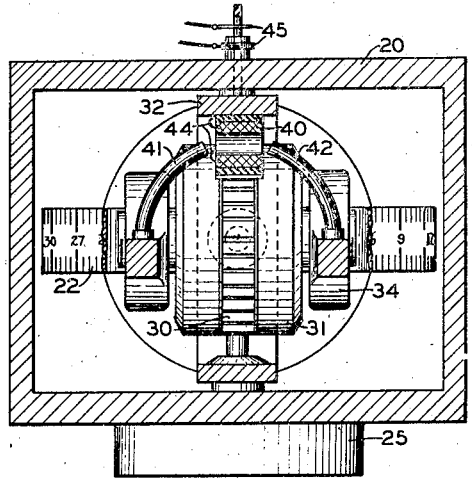
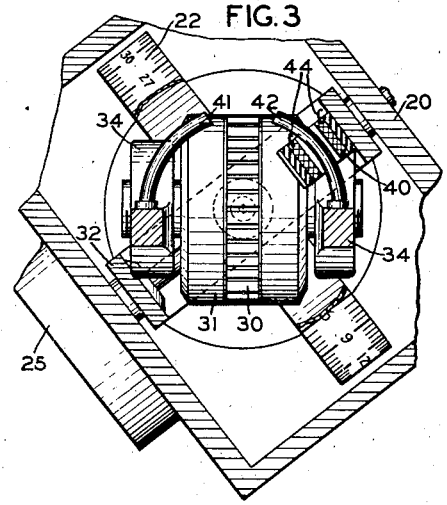
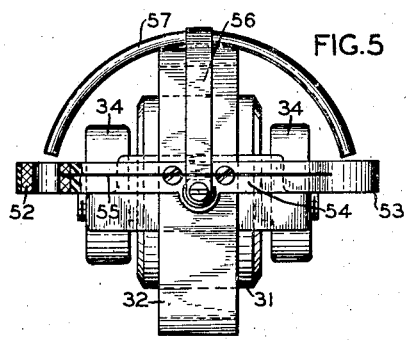
INVENTORS:
LESLIE F. CARTER
FRANCIS WEST, JR.
BY Herbert H. Thompson
their ATTORNEY.

Dec. 10, 1946. L. F. CARTER ET AL 2,412,204
TORQUE EXERTING MEANS
Filed April 10, 1942 2 Sheets-Sheet 2
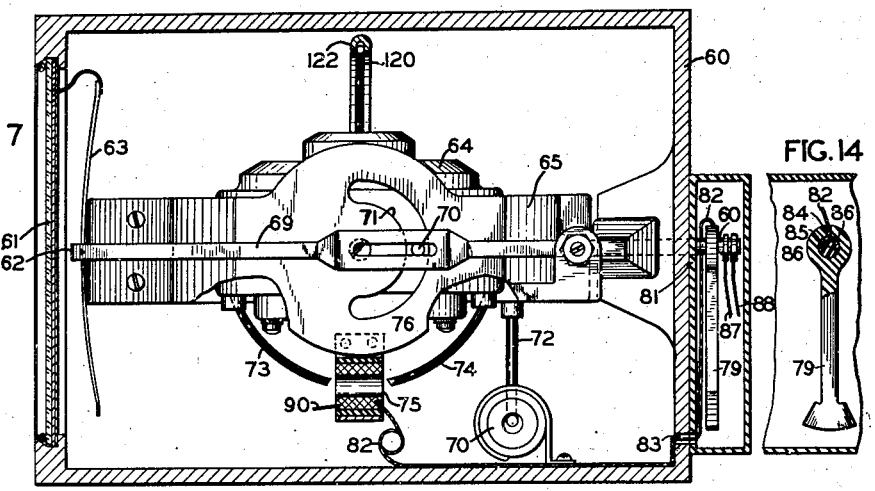
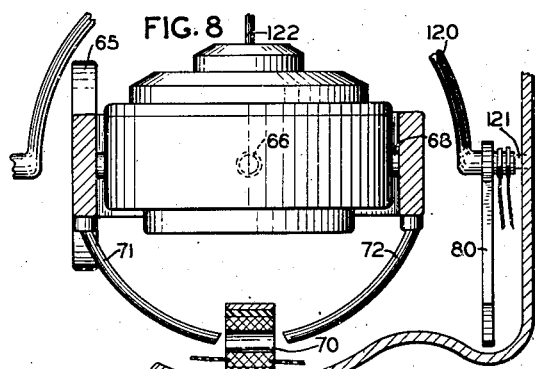
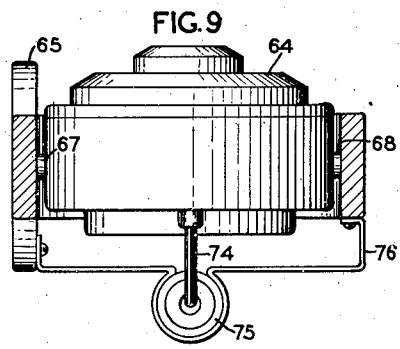
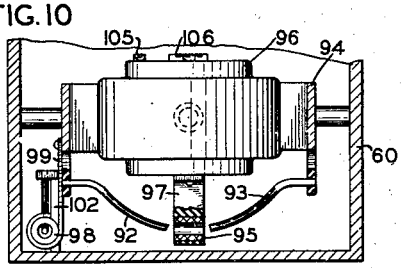
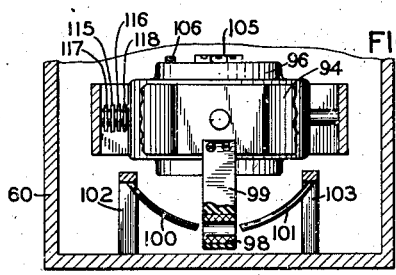
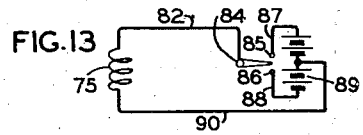
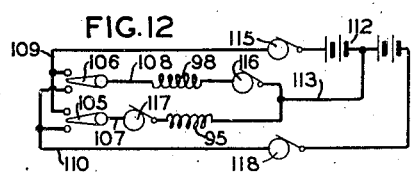
INVENTORS:
LESLIE F. CARTER
FRANCIS WEST, JR.
BY
Herbert H. Thompson
ATTORNEY.

Patented Dec. 10, 1946

2,412,204

UNITED STATES PATENT OFFICE 2,412,204

TORQUE EXERTING MEANS

Leslie F. Carter, Leonia, N. J., and Francis West, Jr., Roslyn, N. Y., assignors to Sperry Gyroscope Company, Inc., Brooklyn, N. Y., a corporation of New York Application April 10, 1942, Serial No. 438,394

1 Claim. (Cl. 74—5)

This invention relates to a torque exerting means for gyroscopic instruments. More particularly, the improved torque exerting means of the present invention is applicable for use as a precession effecting means for controlling directional gyro instruments or an erection effecting means for controlling gyros of the artificial horizon type.

An object of the invention is to utilize a gyro controlling torque exerting means in the form of an electromagnetic couple, which may exert under predetermined conditions a torque on the gyroscope in either of two directions, but which requires a minimum number of wires to be led through or across the delicate pivots supporting the gyroscope.

One of the features of the invention resides in the employment of a coupling of this character constituted of a solenoid and magnetic plunger arranged for relative movement with respect to one another in effecting the desired control of the gyro instrument with which it is associated.

Another feature of the invention consists in the relation of the coupling parts whereby the same are so positioned by the gyroscope during banked turns through a particular heading of the craft on which the gyroscopic instrument is located as to be rendered relatively ineffective at such time.

A further feature of the invention resides in the preferred arrangement of coupling in which a single coil solenoid is employed with a double permanent magnet plunger.

Other objects, features and structural details of the invention will be apparent from the following description when read in connection with the accompanying drawings, wherein Fig. 1 is a side elevation of a directional gyro instrument in which the improved coupling has been incorporated, the casing for the instrument being shown in section.

Fig. 2 is a sectional view taken on line 2—2, in Fig. 1.

Fig. 3 is a further view of the same character as illustrated in Figs. 1 and 2 and showing the relative positions of the coupling parts in this type of instrument during extreme banked turns of the craft on which the instrument is mounted.

Fig. 4 is a detail elevation view of the gyro rotor employed in the illustrative type of directional gyro instrument shown in the drawings, looking in the direction of the arrows 4—4 in Fig. 4.

Fig. 5 is a detail elevation of a modified form of coupling construction showing the mounting of the respective parts of the same on the vertical ring and gyro rotor bearing frame of a conventional gyroscopic instrument of the direction indicating type.

Fig. 6 is a detail wiring diagram of a selective switch by which the polarity of the solenoid unit of the coupling may be controlled.

Fig. 7 is a view similar to Fig. 1 in which the coupling means of the present invention is incorporated in a conventional type of gyro vertical instrument.

Fig. 8 is a detail view showing the coupling means utilized in Fig. 7 employed to exert a torque about the axis of the gimbal ring of the gyro vertical.

Fig. 9 is a further detail view similar to Fig. 8 in which the coupling means employed to exert a torque about the axis of the gyro rotor bearing case of the gyro vertical is shown.

Fig. 10 shows a modified arrangement of the form of the improved coupling means illustrated in Fig. 7.

Fig. 11 is a view similar to Fig. 10 taken at right angles to the same.

Fig. 12 is a detail wiring diagram such as may be employed in controlling the solenoid units of the coupling means illustrated in Figs. 10 and 11.

Fig. 13 is a further detail wiring diagram such as may be employed in controlling each of the individual solenoid units of the coupling means illustrated in Figs. 7, 8 and 9, and Fig. 14 is a detail view of one of the selective controlling switches employed in controlling the coupling means shown in Figs. 7, 8 and 9.

With particular reference to Figs. 1 to 6, inclusive, the disclosed coupling or torque applying means is specifically incorporated for use in a directional gyro instrument of conventional form and is employed therein as a precessing means for controlling the indication of the instrument. The thusly controlled gyro instrument is particularly adapted for use as the slaved unit in a gyro magnetic compass system of the character such as disclosed in our copending application, now Patent No. 2,363,500, dated November 20, 1944, for Gyro magnetic compass system, or in the patent to Sperry, No. 1,982,702, dated December 4, 1934, for Gyro pilots for aircraft. This invention also has application to other types of gyroscopes such, for instance, as a gyro-vertical or a gyroscopic artificial horizon as shown in Figs. 7 to 11 herein and described hereinafter. In the embodiment shown in Figs. 1 to 6, our novel torque exerting means is shown applied to a common form of directional gyro having the usual air tight casing 20 provided with a front window 21 through which the indications on the compass card 22 may be observed and compared with a suitable lubber line (not shown). In the illustrative form of instrument shown, the casing 20 is evacuated by a suitable suction means (not shown) by way of port 23. Air is supplied the instrument, in this instance, through the filter 24 situated in the base 25 of the casing 20 by way of port 26, hollow trunnion 27, pipe 28 and the dual nozzle piece 29 from which it exhausts to impinge on the buckets 30 of the gyro rotor 31 to effect the spinning of the rotor pneumatically. Pipe 28 is mounted on the conventional vertical ring 32 of the instrument, the ring, in turn, being pivotally mounted in casing 20 on the provided trunnions 27 and 33 which are journaled in suitable bearings. The trunnion defined axis of the ring 32 is vertical and the graduated circular compass card 22 is fixed to the ring 32 as clearly shown in Figs. 2 and 3. Further, the directional gyro includes the conventional rotor bearing frame 34 which is pivotally mounted on a horizontally defined axis on the ring 32 by means shown in the present instance as the oppositely disposed stub shafts 35 and 36 and their respectively associated bearings, one of which is designated at 37, in Fig. 1. Gyro rotor 31 is mounted to spin within the bearing frame on a normally horizontal axis defined by stub shafts 38 and 39 which journal in suitable bearings contained in the frame 34. The spin axis of the gyro rotor within the frame 34 is normal to the plane of the paper as the same is viewed in Fig. 1.

In the illustrated form of rotor 31, noted in Fig. 4, the buckets 30 are slightly recessed and provide circumferential edge defining walls 50 and 51 against which the air jets issuing from the dual nozzle piece 29 impinge when the frame 34 tilts about its shaft 35—36 defined axis to exert a reactive torque about the axis of the vertical ring 32 to restore the frame 34 to a normal tilt free position. In the described type of gyroscopic instrument, the support for the gyro motor 31 is provided by the vertical ring member 32 and the bearing frame member 34 whose respective axes are arranged in mutually perpendicular relation. It will be understood that the present invention is not to be considered as limited to use with a directional gyro instrument having the conventional features hereinbefore described.

Our torque exerting means comprises a solenoid 40 preferably having but a single winding but which may be reversed in polarity by reversing the current therethrough, and a magnetic plunger or permanent magnet unit cooperating therewith which in Figs. 1, 2 and 3 is shown in the form of a pair of curved permanent magnets indicated at 41 and 42. Said magnets are curved about the pivotal axis 22 of the rotor bearing frame 34 in the vertical ring so that the coil may pass around either magnet for a major portion of its length (see Fig. 3) without striking, the core of the coil being of somewhat larger diameter than the thickness of the magnet to provide sufficient clearance. In one form of gyroscopic instrument in which the improved torque exerting means is applied, the solenoid 40 is fixedly mounted on the vertical ring 32 and is energized by way of leads 44 and slip rings 45 situated exteriorly of the casing 20. A sleeved trunnion construction 33 including a conducting sleeve and central pin provides the means employed in the present instance for leading electrical energy from the slip rings 45 to leads 44 and thence to the solenoid 40. With reference to Fig. 6, a desirable double-pole, double throw reversing relay indicated at 46 may be employed to control the polarity of the solenoid at a given time. The solenoid 40 controlled by the relay switch 46 is energized by a suitable source of direct current energy as indicated at 47. Relay 46, in turn, is controlled by a separately energized circuit which includes source 48 and a selective relay control 49 that is operated by the distantly located magnetic compass unit (not shown) as disclosed in detail in the hereinbefore identified application for Letters Patent. The above relays 46 and 49 are illustrative of a desirable controlling means for the reversible polarity solenoid 40, it being understood however that other means of obtaining this result may also be employed without departing from the herein disclosed inventive concepts.

The respective magnetic plungers 41 and 42 are fixed at one end thereof to oppositely disposed portions of the frame 34, the free ends of the plungers being of like polarity. The free ends of the respective solenoid cooperating plungers 41 and 42 are normally disposed in adjacent relation to either side of the solenoid 40 in the position shown in Fig. 2. The fields obtained from the adjacent like pole magnetic plungers 41 and 42 being opposed, are attracted in one instance and repelled in the other instance by the particularly directed field obtained from the energized solenoid 40. The resultant torque on the frame 34 is consequently obtained from both of the magnetic plungers. It will be understood that the direction of the field resulting from the reversible polarity solenoid 40 at a given instance determines the direction in which the torque is exerted about the defined axis of the gyro rotor bearing frame 34 to effect the desired movement of the vertical ring 32 and change the relative position of the card with reference to its lubber line.

The cooperating parts of the torque exerting means are movable with respect to one another in such a manner that, as viewed in Fig. 3, the coupling means is substantially rendered automatically self-ineffective during a particular portion of a pronounced banked turn of the craft in which the gyroscopic instrument is mounted. As shown in this figure, the casing 20 and ring 32 are tilted to assume an extreme position during a banked turn of the craft in a clockwise direction. It will be understood that the illustrated position of the ring 32 is for a particular instantaneous heading of the craft during its turn in which the maximum degree of tilt occurs. In this position, the frame 34 maintains its relatively horizontal position and the casing 20, ring 32 and solenoid 40 have moved with relation to the same so that plunger 42 passes through the central opening in the solenoid 40 and a substantially equal extent of the same is positioned on either side of the solenoid. At this time, the field set up by the solenoid has little or no effect on the magnet so that the coupling means is consequently rendered ineffective. This feature is distinctly advantageous in reducing "turn errors" in a slaved directional gyro of the character described due to the fact that the extent of the precession exerting force obtained from the coupling means during turns of the craft is considerably lowered.

In the modification of the invention shown in

Fig. 5, the solenoid is divided into two halves 52 and 53 mounted on opposite sides of the vertical ring 32, the windings of the two halves being connected in series so that they are the equivalent of the single coil 49 of Fig. 1 and require only two leads, as before. Solenoids 52 and 53 are mounted on the vertical ring 32 by means of the oppositely extending arms 54 and 55 which may be formed by a single fastening plate. The magnetic plunger unit of this construction is mounted on a radially extending arm 56 fixed to the end of a trunnion for the frame 34 which in this instance extends through the vertical ring 32. The single permanent magnet 57 is likewise curved about the axis 22, the same being fixedly mounted on arm 56 at its mid portion and extending therefrom to a normal cooperating position adjacent each of the respective solenoids 52 and 53. The precession effecting torque is exerted on the frame 34, in this instance, through the trunnion and arm 56. In both of the heretofore described forms of the invention the torque is considered to be exerted through the magnetic plunger of the coupling means which is arranged for relative movement with respect to fixedly mounted solenoid or solenoids.

With reference to Figs. 7, 8, 9 and 13, the improved torque exerting means is shown adapted for use in a conventional gyro-vertical in which the same provides the means for normally maintaining the gyro rotor bearing frame erect. A conventional gyroscope of this character is shown in the drawings, the same including an air tight casing 60 from which air is suitably withdrawn and admitted in such a manner as to spin the gyro rotor pneumatically. The front portion of the casing 60 includes a window 61 through which the horizon bar 62 is controlled in the usual manner by the gyro instrument which itself includes a rotor bearing frame or case 64 in which the gyro rotor (not shown) is mounted so that its axis of spin is normally vertical. The support for the gyro rotor also includes a conventional gimbal ring 65 whose normal horizontal axis is arranged in parallel relation to the fore and aft axis of the craft on which the instrument is mounted. The axis of the gimbal ring 65 is indicated at 66 in Fig. 8 of the drawings. Also, the rotor bearing frame 64 is pivotally mounted by means of suitable trunnions 67 and 68 which journal in bearings provided therefor in the ring 65, the athwartship or lateral axis of support of the gyro instrument being defined in this manner. As in the previously described form of the invention, the support for the gyro rotor includes two members, respectively, the rotor bearing frame or case and the gimbal ring, whose axes are arranged in mutually perpendicular relation. Further conventional structure in this instrument is provided by the counterweighted pivotally mounted long lever 69 on said ring 65 whose end includes the horizon bar 62. Lever 69 is slotted to receive a pin 70 which extends from the gyro rotor case 64 through a curved slot 71 located in the gimbal ring.

Two coupling units are employed in this form of the invention, Fig. 8, showing the unit for exerting a torque about the axis of the gimbal ring 65 and Fig. 9 showing the unit for exerting a torque about the axis of the rotor bearing frame 64. In Fig. 8, the solenoid 70 is fixed to the casing 60. The cooperative curved magnet plungers employed, in this instance, as designated at 71 and 72, are fixed to the bottom of the gimbal ring 65. In Fig. 7, the relatively movable plungers 73 and 74 are fixedly mounted on the rotor bearing frame 64 and the cooperating solenoid 75 is fixed in position on the gimbal ring by means such as a holding plate 76.

The selective means for controlling the polarity of the respective solenoids 70 and 75 is provided in this form of the invention by a gravitationally controlled switch for each of the solenoids. Each of these switches are of the same fundamental construction as shown in Fig. 14 so only one of the same will be described in detail. With reference to Fig. 7, the switch for controlling solenoid 75 is preferably mounted in a separate casing 78 joined to the gyro casing 60. The rear trunnion of the gimbal ring 65 projects through the respective casings and provides a journal forming portion for a pendulum controlling member 79. With reference also to Fig. 13, the switch arrangement illustrated is constituted by a radially positioned current conducting pin 84 situated in pendulum member 79. A lead 82 connects the pin 84 with one terminal of the solenoid 75, the same passing through an opening 83 in the respective casings 60 and 78. The cooperating parts of the switch for pin 84 are shown in the form of current conducting sector pieces 85 and 86 which are mounted in the projecting end of the trunnion of ring 65. Leads 87 and 88 for the respective spaced sector pieces 85 and 86 are connected to opposite terminals of a suitable direct current supplying source such as battery 89. To complete the controlling circuit for solenoid 75, a further lead 90 is provided which connects the opposite terminal of the solenoid 75 to a center tap position in the battery source 89. When due to relative movement between the pendulum 79 and gimbal ring 65, the pin 84 moves to contact either of the sector members 85 or 86, the controlling circuit shown in Fig. 13 is closed in Fig. 13 is closed in a desired manner to determine the resultant polarity of the field set up by solenoid 75, the same then being effective to exert a torque about the axis of the rotor bearing frame or case 64.

Relative inclination of the parts about the minor axis of the gyro-vertical instrument is utilized by the solenoid controlling switch for this axis which is linked to solenoid 70 by the same type of controlling circuit previously described. The switch proper includes a control pendulum 80 which in this instance journals on a bail member 120 which is pivotally mounted within the casing 60 by means of two oppositely disposed fixed pins 121. As shown in Fig. 7, the bail 120 is grooved about its under surface to receive the end of an extension member 122 fixedly mounted on the top of the rotor bearing case 64. The switch forming parts as shown in Fig. 14 are in this instance incorporated in the rotatably related pendulum and bail members of the arrangement and the solenoid 70 is controlled therefrom in the manner previously described in connection with Fig. 13. Joint action of the coupling means is operative to maintain the gyro rotor bearing frame 64 in an erected position in which the spin axis of the rotor is vertically positioned.

A further modification of the invention is shown in Figs. 10, 11 and 12 in which the electromagnetic coupling means is embodied for use in a gyro vertical instrument but in which the relative positions of the solenoids and magnetic plungers are reversed. In the arrangement shown in Fig. 10, the magnet members 92 and 93 are fixed in position upon the gimbal ring 94 and the cooperating solenoid 95 for the same is mounted in a relatively movable position with respect thereto being mounted in this instance in the gyro rotor bearing frame 96 by means of the downwardly extending holding piece 97. This is the equivalent of the form of the invention shown in Fig. 9. In Fig. 11, the electromagnetic coupling is arranged to exert a torque about the axis of the gimbal ring 94. In this instance, the solenoid 98 is mounted on the ring 94 by means of extending arm 99 and the cooperating magnetic plungers 100 and 101 are fixed in position in the casing 60 on the respective supports 102 and 103. During banked turns of the craft on which the gyro vertical instrument is mounted, the gimbal ring 65 or 94 moves relatively to the casing 60 so that in a portion of the turn the related solenoid and plunger coupling means is momentarily rendered self-ineffective.

The selective means for controlling the polarity of the respective solenoids 95 and 98 in Figs. 10 and 11, is shown as provided by a fluid level operative switch such as indicated at 105 and 106. Each of these switches includes a central common terminal, in this instance this terminal for switch 105 being connected to one terminal of solenoid 95 by way of lead 107. The other central switch terminal is connected to one terminal of solenoid 98 by way of lead 108. Level switches 105 and 106 are situated in this instance on the rotor bearing frame or case 96, the mercury or other current conducting fluid therein being normally situated midway of the length of the tube in which the same is contained in a position in which the same is not in contact with either of the further terminals therein located in a portion of the end surface of the tubes. It will be understood, that when the liquid level tube switch tilts the globule of mercury or other conducting fluid changes position to selectively close the circuit through the switch. As shown in Fig. 12, similar end terminals in the respective level switches are connected by leads 109 and 110, respectively. Leads 109 and 110 receive energy, when the respective switches are closed, by means of a suitable battery such as indicated at 112. Common lead 113 connecting the respective solenoid coils 95 and 98 closes the respective circuits by being connected to a center tap position of battery 112. The noted slip rings 115, 116, 117 and 118 are employed at one of the trunnions of the rotor bearing frame or case 96 for the purpose of bringing the energy for the respective solenoids both to and from the controlling switches situated on the bearing frame or case 96. The operation of this circuit is similar to that heretofore described, it being understood that switch 105 is responsive to tilt about the axis of the gimbal ring 94 and switch 106 is responsive to tilt about the axis of the rotor bearing frame or case 96.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A torque-exerting electromagnetic couple for directional gyroscopes having a vertical ring and a gyro rotor bearing frame pivoted therein about an axis, comprising a solenoid fixed to the ring and displaced relatively to said axis, two bar magnets arranged in polar opposition with the outer end of each of the same fixed to the frame on opposite sides of said axis, said magnets being curved about said axis so that their inner ends lie adjacent the open ends of said solenoid, a circuit in which said solenoid is included, and means outside of said gyroscope for controlling said circuit to reverse the polarity of said solenoid.

LESLIE F. CARTER.
FRANCIS WEST, Jr.